United States Patent Office 3,415,624
Patented Dec. 10, 1968

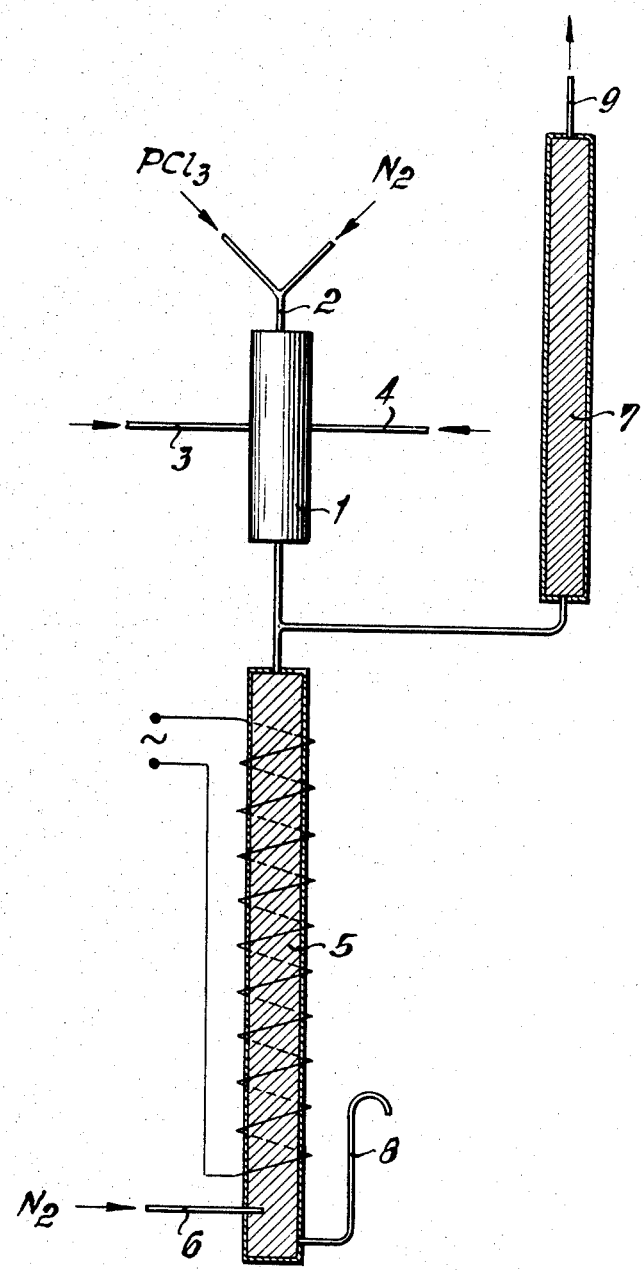

3,415,624
PROCESS AND APPARATUS FOR THE MANU-
FACTURE OF PHOSPHOROUS ACID
Joseph Cremer, Hermulheim, near Cologne, Ursus
Thummler and Friedrich Schulte, Hurth, near
Cologne, and Heinz Harnisch, Lovenich, Weiden,
Germany, assignors to Knapsack Aktiengesell-
schaft, Knapsack, near Cologne, Germany, a cor-
poration of Germany
Filed Aug. 6, 1965, Ser. No. 477,715
Claims priority, application Germany, Sept. 19, 1964,
K 540,461
6 Claims. (Cl. 23—165)

ABSTRACT OF THE DISCLOSURE

Apparatus and process for the manufacture of phos-
phorous acid from phosphorus trichloride and water by
hydrolysis comprising introducing phosphorus trichloride
and water as the starting components in finely divided
form into a reaction zone, intimately mixing the compo-
nents, reacting the components in the gas phase at a
temperature of 150 to 200° C., and removing resulting
final product in the form of a melt.

The present invention provides a one-stage process for
the manufacture of $H_3PO_3$ by hydrolyzing $PCl_3$.

It is known that $H_3PO_3$ can be produced by hydrolyz-
ing $PCl_3$. The reaction incurs difficulties which are pro-
duced by the poor miscibility of the reactants and by the
considerable amount of reaction heat set free once the
reaction has started.

In order to reduce such difficulties, it has been at-
tempted, for example, to admix $PCl_3$ with $CCl_4$ and
slowly to add water to the mixture so as to allow the
hydrolysis to take place in dilute material and hence
under mild thermal conditions. This process did not gain
commercial interest for the reason that elevated through-
puts call for a large volume of liquid and for the reason
that crude $H_3PO_3$ is a product difficult to purify.

In order to improve mixing and to accelerate the re-
action, it is suggested in another known process that $PCl_3$
and an excess of water of 3.6 to 4.2 mols $H_2O$ per mol
$PCl_3$ be introduced into a reactor which is charged with
$H_3PO_3$, HCl and water and provided with a cooling coil.
In this process, the reaction is generally carried out at a
temperature of 50 to 60° C. Mixing of the reactants in the
reactor sump portion is achieved by means of HCl-gas
bubbles which ascend in the liquid.

A still further conventional process aims at obviating
cooling. Stoichiometric proportions of $PCl_3$, water and
steam are introduced in measured quantities into a reactor
which is charged with $H_3PO_3$, $H_2O$ and HCl and which
is designated so as to enable the material in the reactor
sump portion to be circulated in the liquid reactor by
means of gas bubbles ascending and by means of the dif-
ferential temperatures prevailng therein. In this process,
the reaction temperature is at about 75–200° C. and some
heat exchange is likely to occur at the reactor walls.

In a still further process, $PCl_3$ is metered into a sump
of reaction material consisting of $H_3PO_3$, $H_2O$ and HCl
and partially hydrolyzed therein. $PCl_3$, i.e. about 40% of
the quantity introduced, which is evaporated by the re-
action heat set free is hydrolyzed in the gas phase. A
stoichiometric proportion of water is added at the head
portion of the apparatus counter-currently to $PCl_3$ in
vapor form. This process employs no cooling means and
the desired temperature is produced by heating the liquids
chamber and the gas chamber.

In the above process, crude acid such as withdrawn
from the reactor sump portion must always be freed in
a second step from $H_2O$ and hydrochloric acid at a tem-
perature of 100 to 150° C. by causing an inert gas to
flow therethrough or by evacuation.

The disadvantages associated with the processes de-
scribed above accrue from the difficulties mentioned above
and encountered on hydrolyzing $PCl_3$. Liquid $PCl_3$, when
cold, reacts very reluctantly with water. The two reactants
differ in density and therefore produce two phases so that
hydrolysis sets in reluctantly near the two phases' bound-
ary surface only. Allowing the material to stand for a
period long enough or agitating and/or heating it results
in the reaction setting in at once which may become so
violent that the decomposition temperature of $H_3PO_3$
(200° C.) is reached or even exceeded due to local
superheating.

In order to avoid these two kinds of difficulties, i.e.
too low a reaction velocity and superheating, the above
processes always introduce $PCl_3$ into a sump of reaction
material consisting of $H_3PO_3$, HCl and $H_2O$ since the
hydrolysis takes place in such medium at a tolerable re-
action velocity. HCl-gas bubbles such as set free during
the reaction are used for stirring up the sump to achieve
the necessary mixing of the reactants which include $PCl_3$
and water, to achieve heat distribution concurrently there-
with and optionally to achieve heat dissipation through a
cooling coil or the reactor walls.

The large volume of liquid, which must necessarily be
used for large throughputs to achieve complete hydrol-
ysis within a reasonable period and to achieve heat dis-
tribution or heat dissipation renders this process unsatis-
factory and uneconomic.

The production of pure phosphorus acid, which must
necessarily be prepared from the reaction sump, is more
especially an uneconomic procedure. Removing the par-
tially considerable amounts of $H_2O$ and HCl from crude
$H_3PO_3$ always calls in these processes for a second treat-
ment step which comprises evacuating the crude acid or
passing an inert gas therethrough at a temperature of
100 to 150° C. to concentrate the crude acid so as to ob-
tain pure $H_3PO_3$.

The present invention now provides a simple process
for making $H_3PO_3$ by hydrolyzing phosphorus trichloride
and water, wherein the starting components are intro-
duced in finely divided form into a reaction chamber,
intimately mixed therein, reacted in the gas phase at a
temperature of 150 to 200° C. preferably of 160 to 190°
C., and the resulting final product is withdrawn in the
form of a melt. Intimate mixing of the reaction compo-
nents which are used, e.g. in the form of an aerosol, re-
sults in a high reaction velocity, which enables relatively
small reaction spaces to be employed. As opposed to
conventional methods, the present invention offers the
further advantage of obviating using any additional vol-
ume for crude acid otherwise necessary to achieve the
reaction, i.e. of obviating the reaction sump.

The process of the present invention even enables the
hydrolysis to be carried out at a temperature approaching
the temperature at which $H_3PO_3$ undergoes thermal decomposition (200° C.) provided that exothermal reaction heat initiating the decomposition is dissipated at least partially in the form of heat of evaporation for $PCl_3$ and water.

The temperatures at which the reaction shall take place can be adjusted and regulated by injecting the water in drop, mist or vapor form into the reactor at an appropriate low temperature. The water is optionally used in an excess related to the amount theoretically necessary to hydrolyze $PCl_3$.

A temperature range of 150–200° C., preferably 160–190° C., is most conveniently used for causing the $PCl_3$ to react instantaneously with water and for rapidly expelling water and hydrochloric acid from the resultant $H_3PO_3$.

It has also been found that the reaction velocity can be varied within wide limits by the size of the $PCl_3$-droplets.

For example, the reaction takes an explosion-like course when the $PCl_3$-droplets have a mean size smaller than $50\mu$ (mist) and when a slight excess of steam is used, whereas seconds or minutes are necessary to achieve the reaction when the droplets have a mean size greater than $500\mu$. $PCl_3$-droplets having a mean size greater than $50\mu$ and less than $500\mu$ are most conveniently used.

The starting components are advantageously atomized by means of an inert gas, e.g. air, nitrogen or $CO_2$.

Following the reaction, residual $H_2O$ and HCl are expelled at about the same temperature as indicated above from the reaction product by evaporation and/or by means of an inert gas, e.g. air, nitrogen or $CO_2$. To expel residual hydrochloric acid and water, the $H_3PO_3$-melt which deposits in the vapor space on the reactor walls is allowed to travel through a heated evaporator into which air, $N_2$ or $CO_2$ is injected in conventional manner. The $H_3PO_3$-melt which is continuously discharged through an overflow solidifies on being cooled and inoculated.

The products prepared in accordance with the present invention contain Cl' in a proportion less than 0.05%, $PO_4^-$ in a proportion less than 1.4%, and $H_2O$ in a proportion less than 1.5%.

An apparatus suitable for use in carrying out the process of the present invention is shown diagrammatically in the accompanying drawing. It is made of material resisting to hydrochloric acid, e.g. glass, ceramics, Diabon or graphite.

The apparatus comprises a reaction chamber 1 which has feed pipes 2, 3 and 4 supplying and means distributing the reaction components, a series-connected evaporator 5 which has a feed line 6 disposed in its lower portion for supplying expelling gas and has an overflow 8, and a separator 7 which has an off-gas pipe 9 disposed in its upper portion. Evaporator 5 communicates with the bottom portion of reaction chamber 1 and communicates with the bottom portion of separator 7.

In reactor 1, $PCl_3$ is atomized by means of nozzle 2. The atomization can be brought about with the aid of the means distributing the reaction components and including single and multi-opening nozzles and/or with the aid of a mechanical distributing or atomizing means, e.g. a rotating plate. Gases suitable for two-opening nozzles include air, $N_2$, $CO_2$ and other substances which do not react with the reactants. A rotating plate is most conveniently used as a mechanical atomizer. Steam is injected through feed pipe 3, and the single opening nozzle 4 can be used to convert water into mist. $H_3PO_3$ formed in reaction chamber 1 is caused to flow into heatable evaporator 5 which is charged through pipe 6 with an inert gas, preferably air or nitrogen, and in which residual HCl and $H_2O$ are removed. Steam in excess, hydrochloric acid, entrained $H_3PO_3$-droplets, residual $PCl_3$ and inert gas are conveyed to separator 7, in which the $H_3PO_3$-droplets entrained are separated while residual $PCl_3$ reacts with steam in excess to give $H_3PO_3$ which is recycled into evaporator 5. Steam and HCl escape through off-gas line 9 into a HCl-absorption system of conventional design.

A melt of pure $H_3PO_3$ is continuously discharged through overflow 8 and caused to solidify on a cooled crystallizer (not shown in the drawing).

The following examples illustrate the process of the present invention.

Example 1

2820 gram/hr. $PCl_3$ were atomized into the reactor by means of a two-opening nozzle and with the aid of 400 liter/hr. $N_2$. 1540 gram/hr. steam were introduced concurrently therewith. The reaction temperature in the gas phase was 185–190° C. A melt of $H_3PO_3$ running down the reactor walls was conveyed into a heated evaporator and freed therein at 166° C. from adhering residual $H_2O$ and HCl by causing 150 liter/hr. $N_2$ to travel through the evaporator. The $H_3PO_3$-melt which was continuously discharged through the overflow crystallized on cooling. 1592 gram/hr. $H_3PO_3$, corresponding to a yield of 95% were obtained. The product contained Cl' in a proportion less than 0.05%, $PO_4^-$ in a proportion less than 1.4%, and $H_2O$ in a proportion less than 1.5%.

Example 2

8500 gram/hr. $PCl_3$ were atomized into the reactor by means of a two-opening nozzle and with the aid of 500 liter/hr. $N_2$. 4330 gram/hr. steam were introduced concurrently therewith through steam supply lines. The reaction temperature in the gas phase was 188–195° C. $H_3PO_3$ running down the reactor walls was conveyed into a heated evaporator and freed therein at 187° C. from adhering residual HCl and $H_2O$ by causing 100 liter/hr. $N_2$ to travel therethrough. The $H_3PO_3$-melt which was continuously discharged through the overflow crystallized on cooling. 4800 gram./hr. $H_3PO_3$, corresponding to a yield of 94.7%, were obtained. The product contained Cl' in a proportion less than 0.05%, $PO_4^-$ in a proportion less than 1.4%, and $H_2O$ in a proportion less than 1.5%.

Example 3

8500 gram/hr. $PCl_3$ were atomized into the reactor by means of a two-opening nozzle and with the aid of 500 liter/hr. $N_2$. 2730 gram/hr. steam and 1040 gram/hr. water, supplied in mist form through a single material nozzle, were introduced concurrently therewith. The reaction temperature in the gas phase was 175–180° C. $H_3PO_3$ running down the reactor walls was conveyed into a heated evaporator and freed therein at 180° C. from adhering residual water and HCl by causing 100 liter/hr. $N_2$ to travel therethrough. 4830 gram/hr. $H_3PO_3$, corresponding to a yield of 95.3%, were obtained. The product contained Cl' in a proportion less than 0.05%, $PO_4^-$ in a proportion less than 1.4% and $H_2O$ in a proportion less than 1.5%.

Example 4

4770 gram/hr. $PCl_3$ were introduced through a feed pipe into a reactor heated at 90° C. by means of a water jacket and provided with a rotating plate in a manner such that the $PCl_3$-jet struck the plate while it rotated at a speed of about 1500 r.p.m., and became atomized. 2152 gram/hr. steam were introduced concurrently therewith through further feed pipes. The reaction temperature in the gas phase was 165–170° C. $H_3PO_3$ running down the reactor walls was conveyed into a heated evaporator and freed therein at 190° C. from adhering residual $H_2O$ and HCl by causing 100 liter/hr. $N_2$ to travel therethrough. 2696 gram/hr. $H_3PO_3$, corresponding to a yield of 94.6%, were obtained. The product contained Cl' in a proportion less than 0.05%, $PO_4^{---}$ in a proportion $PO_4$ in a proportion less than 1.4%, and $H_2O$ in a proportion less than 1.5%.

We claim:

1. A process for hydrolyzing $PCl_3$ to form $H_3PO_3$, said process including the steps of spraying into a reactor a stream of steam and a stream of $PCl_3$ droplets between 50 and 500 microns in size to hydrolyze the droplets at a temperature from 150 to 200° C., and causing the crude $H_3PO_3$ as it is formed to drop into an evaporator where it is heated and blown with an inert gas to purify it.

2. A process for hydrolyzing $PCl_3$ to form $H_3PO_3$, in which process essentially only $PCl_3$ and water are introduced into the vapor space of a reactor having an outlet in its lower portion, the $PCl_3$ being sprayed in as a stream of droplets 50 to 500 microns large said water being at least partially introduced as a stream of steam to cause the $PCl_3$ to hydrolyze at a temperature from 150 to 200° C. and to also cause the $H_3PO_3$ so formed to drop out the reactor outlet.

3. The process of claim 1 in which the reaction temperature is between 160 and 190° C.

4. The process of claim 2 in which the reaction temperature is between 160 and 190° C.

5. The process of claim 1 in which a spray of liquid water is also introduced into the reactor along with the $PCl_3$ and the steam.

6. The process of claim 2 in which the $PCl_3$ is sprayed in with the help of a stream of inert gas.

References Cited

UNITED STATES PATENTS 2,670,274    2/1954    Jones _____ 23—165

OTHER REFERENCES

J. Nassler: Collection Czech. Chem. Communications vol. 28 (12), pp. 3424–30 (1963).

OSCAR R. VERTIZ, *Primary Examiner.*

A. J. GREIF, *Assistant Examiner.*

U.S. Cl. X.R.

23—259.2